(12) United States Patent
Laio

(10) Patent No.: US 6,529,371 B1
(45) Date of Patent: Mar. 4, 2003

(54) BEZEL FASTENING STRUCTURE FOR COMPUTER ENCLOSURE

(75) Inventor: Nien Chiang Laio, Taipei (TW)

(73) Assignee: Hon Haiprecision Ind. Co., Ltd., Taipei Hsien (TW)

( * ) Notice: Subject to any disclaimer, the term of this patent is extended or adjusted under 35 U.S.C. 154(b) by 50 days.

(21) Appl. No.: 09/928,885

(22) Filed: Aug. 13, 2001

(51) Int. Cl.[7] ............................... H05K 5/00; G06F 1/16
(52) U.S. Cl. .................. 361/681; 361/683; 292/80; 248/917; 312/223.2
(58) Field of Search ................... 361/679, 681, 361/682, 683; 292/80, 81; 16/221, 232; 248/917, 918; 312/223.1–223.3

(56) References Cited

U.S. PATENT DOCUMENTS

| | | | | |
|---|---|---|---|---|
| 5,823,644 A | * | 10/1998 | Suh et al. ................. | 312/223.2 |
| 5,967,633 A | * | 10/1999 | Jung ........................ | 312/223.2 |
| 5,997,115 A | * | 12/1999 | Radloff et al. ............... | 312/222 |
| 6,157,423 A | * | 12/2000 | Stonebraker et al. ......... | 349/58 |
| 6,373,690 B1 | * | 4/2002 | Buican et al. ............... | 361/683 |
| 6,462,939 B1 | * | 10/2002 | Heirich ........................ | 361/682 |

* cited by examiner

Primary Examiner—Jayprakash N. Gandhi
(74) Attorney, Agent, or Firm—Wei Te Chung

(57) ABSTRACT

A bezel fastening structure includes a computer enclosure (10), a fixing member (60) and a computer bezel (100). A pair of protrusions (37, 51) is formed at one side of the enclosure. A pair of openings (40, 54) is defined in an opposite side of the enclosure. A receiving hole (59) is defined in the opposite side of the enclosure. The fixing member includes a base (62) and a lock (64). A pair of catches (72) extends away from the base. A button portion (78) is formed between the catches, and is movably received in the receiving hole. The lock has a backplate (84) for controlling movement of the button portion. A pair of hooks (102) and a pair of clasps (106) are rearwardly formed at opposite sides of the bezel. The hooks are engaged with the protrusions, and the clasps are engaged in the openings and with the catches.

13 Claims, 6 Drawing Sheets

US 6,529,371 B1

BEZEL FASTENING STRUCTURE FOR COMPUTER ENCLOSURE

BACKGROUND OF THE INVENTION

1. Field of the Invention

The present invention relates to means for attaching bezels to computer enclosures, and more particularly to fastening structures used to effect such attachment.

2. Description of Related Art

A personal computer generally comprises an enclosure and a bezel. The enclosure is used to accommodate a variety of components of the computer. The bezel is generally attached to a front of the enclosure.

A bezel is conventionally attached to an enclosure with screws. Installation of screws with a tool is unduly complicated and laborious, and reduces the efficiency of assembly in mass production facilities. Similarly. removal of the screws is also unduly complicated and laborious.

To resolve the above problems, fastening structures are used to secure a computer bezel to a computer enclosure. An example of one such fastening structure is disclosed in Taiwan Patent Application No. 85202167. The enclosure comprises a bottom panel and a pair of opposite side panels, and thus has a U-shaped front profile. A pair of slot mortises is defined near a front portion of each side panel, and a spring tab extends forwardly and inwardly from the front portion between the mortises. Each of opposite side flanges of the bezel forms a pair of tenons extending toward the enclosure. The tenons of the bezel extend into the enclosure and fit into the mortises of the enclosure, and each spring tab simultaneously abuts against an inner extremity of the corresponding side flange of the bezel. The spring tabs outwardly press the side flanges of the bezel, ensuring that the tenons are adequately engaged within the mortises. The installation of the bezel to the enclosure is convenient and secure.

However, a cover and a pair of side walls are then attached to the enclosure. The mortises and the tenons are covered by the cover and the side walls. To detach the bezel from the enclosure, the cover and the side walls must first be removed. This is most inconvenient and time-consuming.

Thus, an improved fastening structure for convenient attachment and detachment of a computer bezel is desired.

SUMMARY OF THE INVENTION

Accordingly, an object of the present invention is to provide a fastening structure which conveniently installs and detaches a computer bezel.

In order to achieve the object set out above, a bezel fastening structure of the present invention comprises a computer enclosure, a fixing member and a computer bezel. A pair of protrusions is formed at one side of the enclosure. A pair of openings is defined in an opposite side of the enclosure. A receiving hole is defined in the opposite side of the enclosure. The fixing member comprises a base and a lock. A through hole is defined in the base for receiving the lock. A pair of catches extends away from the base. A button portion is formed between the catches and is movably received in the receiving hole of the enclosure. The lock has a backplate for abutting against the button portion after attachment of the bezel. A pair of hooks and a pair of clasps are rearwardly formed at opposite sides of the bezel. The hooks are engaged with the protrusions, and the clasps are engaged in the openings of the enclosure and with the catches of the fixing member. The bezel is thereby attached to the enclosure. To detach the bezel from the enclosure, the backplate is rotated away from the button portion, and the button portion is pressed inwardly to cause the clasps to disengage from the openings and the catches. Then the bezel is outwardly rotated such that the hooks disengage from the protrusions.

Other objects, advantages and novel features of the present invention will become more apparent from the following detailed description when taken in conjunction with the accompanying drawings.

DETAILED DESCRIPTION OF THE INVENTION

Figure 1:
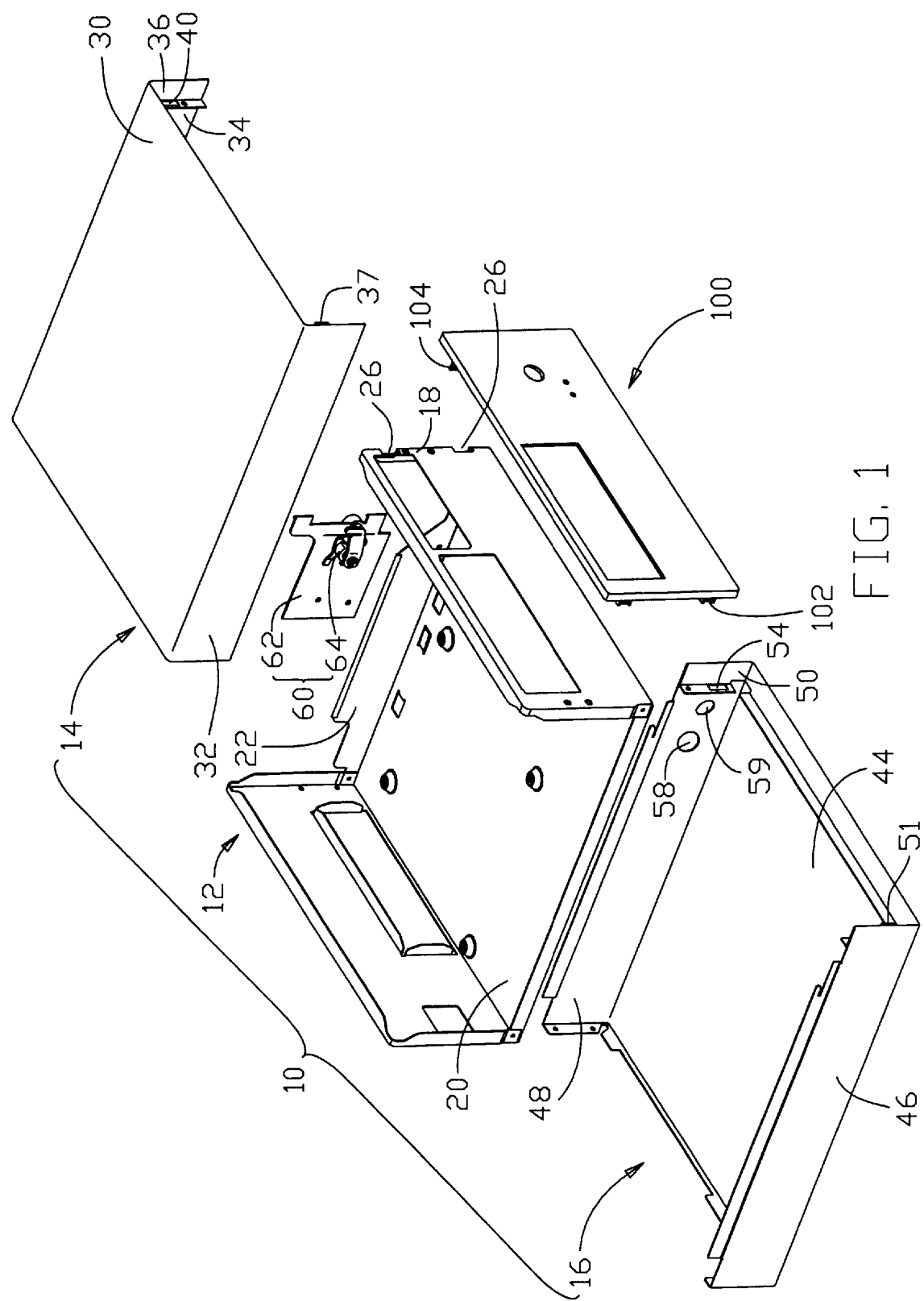
FIG. 1 is an exploded view of a bezel fastening structure in accordance with a preferred embodiment of the present invention.

Reference will now be made to the drawing figures to describe two embodiments of the present invention in detail.

Referring to FIG. 1, a bezel fastening structure in accordance with a preferred embodiment of the present invention comprises a computer enclosure 10, a fixing member 60 and a computer bezel 100. The bezel fastening structure attaches the bezel 100 to the enclosure 10.

The enclosure 10 comprises a main body 12, a cover 14 and a chassis 16. The main body 12 comprises a front plate 18, a bottom plate 20 and a side plate 22. The side plate 22 extends upwardly from an edge of the bottom plate 20. A pair of vertically spaced notches 26 is defined in the front plate 18 at a side extremity thereof nearest the side plate 22.

The cover 14 has an inverted U-shaped profile. The cover 14 comprises a top wall 30, and a pair of first and second sidewalls 32, 34 depending from opposite sides of the top wall 30. A first bent tab 35 is inwardly formed at a front portion of the first sidewall 32 (see FIG. 3). The first bent tab 35 doubles back over an inner surface of the first sidewall 32 from a front edge of the first sidewall 32, and then extends perpendicularly inwardly toward the second sidewall 34. A protrusion 37 (best seen in FIG. 3) is inwardly formed from the first sidewall 32 above the first bent tab 35. A second bent tab 36 is inwardly formed at a front portion of the second sidewall 34. The second bent tab 36 is a mirror image of the first bent tab 35. An opening 40 is defined in the second bent tab 36, corresponding to a topmost notch 26 of the main body 12.

The chassis 16 has a U-shaped profile. The chassis 16 comprises a bottom panel 44, and a pair of first. and second side panels 46, 48 extending upwardly from opposite sides of the bottom panel 44. A first bent flange 49 is inwardly formed at a front portion of the first side panel 46 (see FIG.

3). The first bent flange 49 doubles back over an inner surface of the first side panel 46 from a front edge of the first side panel 46, and then extends perpendicularly inwardly toward the second side panel 48. A protrusion 51 (best seen in FIG. 3) is inwardly formed from the first side panel 46 below the first bent flange 49. A second bent flange 50 is inwardly formed at a front portion of the second side panel 48. The second bent flange 50 is a mirror image of the first bent flange 49. An opening 54 is defined in the second bent flange 50, corresponding to a bottommost notch 26 of the main body 12. A bore 58 is defined in the second side panel 48 between a middle thereof and a front thereof A receiving hole 59 is defined in the second side panel 48 between the bore 58 and the second bent flange 50. The receiving hole 59 is in general alignment with the opening 54 of the second bent flange 50.

Figure 2:
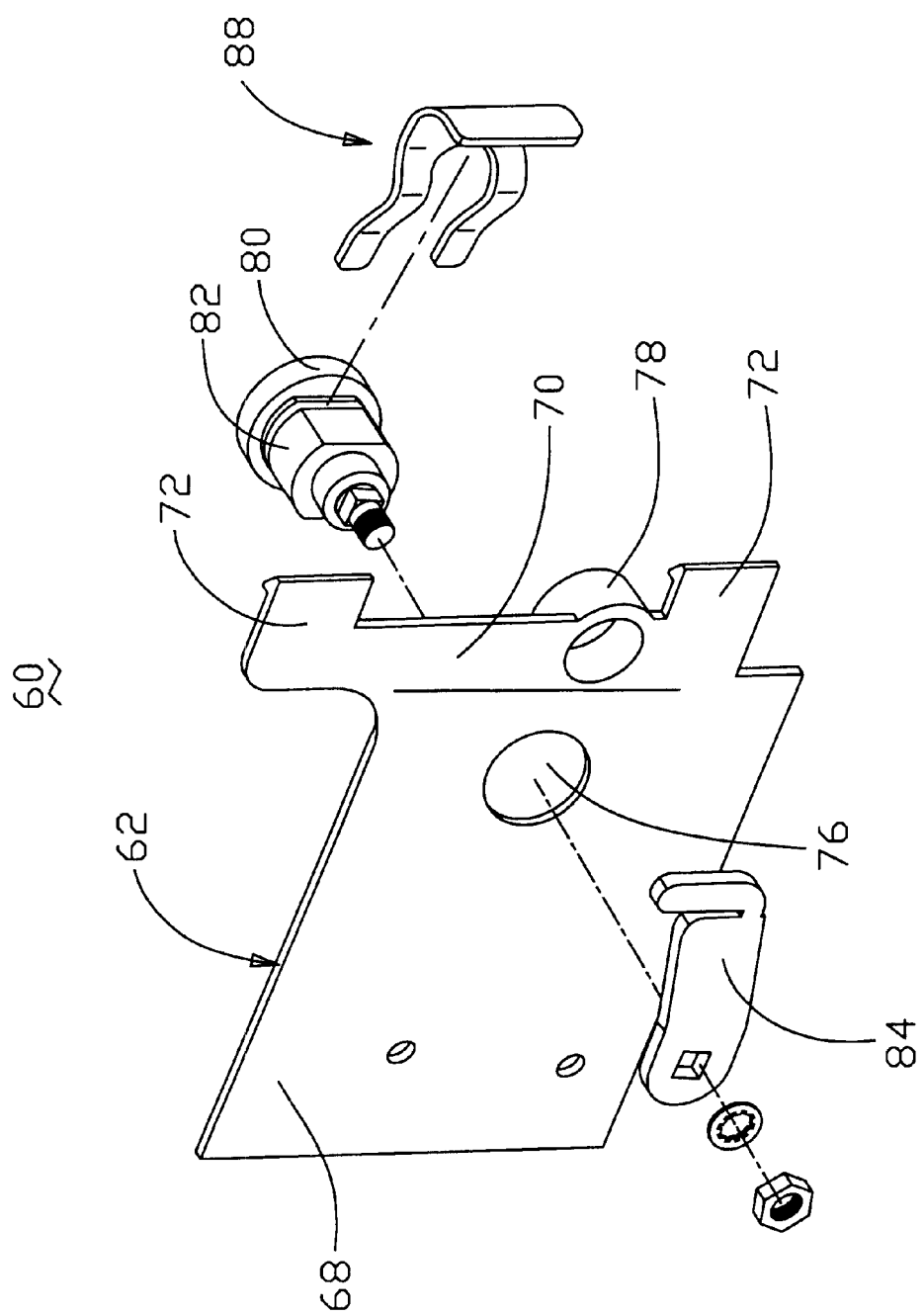
FIG. 2 is an exploded view of a fixing member of the bezel fastening structure of FIG. 1.
Figure 5:
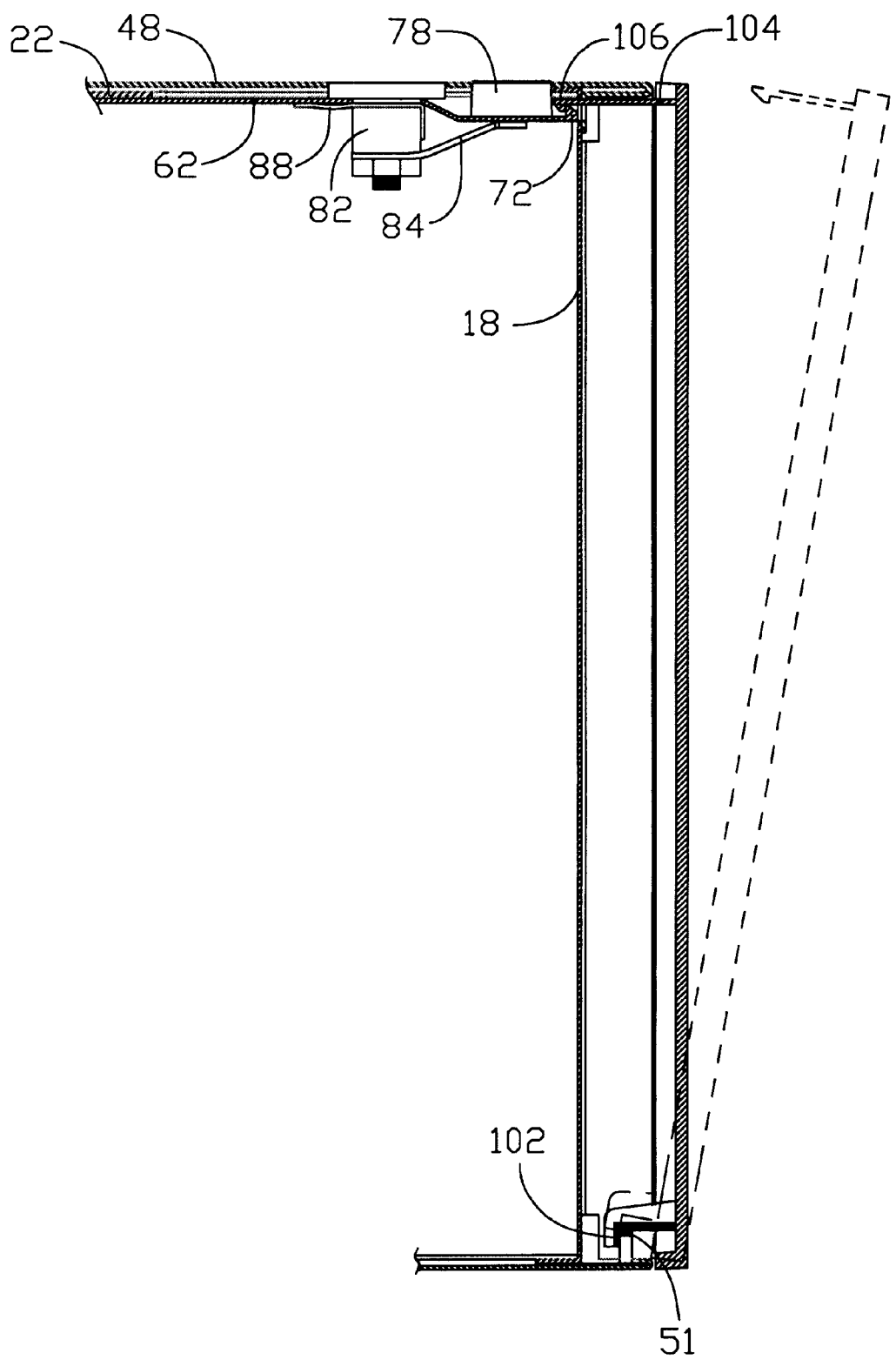
FIG. 5 is a schematic cross-sectional view of part of the bezel fastening structure of FIG. 4, taken along line V—V of FIG. 4.

Referring particularly to FIG. 2, the fixing member 60 comprises a base 62 and a lock 64. The base 62 comprises a main portion 68, an elastic portion 70, and a pair of catches 72. A through hole 76 is defined in the main portion 68. The elastic portion 70 extends at an acute angle from an end of the main portion 68 and further extends at an obtuse angle such that a main section (not labeled) of the elastic portion 70 distal from the main portion 68 is generally parallel to but offset from the main portion 68 (see also FIG. 5). The catches 72 are formed on a face of the main section of the elastic portion 70 which is nearest the main portion 68, at top and bottom distal edges of the elastic portion 70. A hollow cylindrical button portion 78 is formed on the said face of the main section of the elastic portion 70, generally between the catches 72. An outside diameter of the button portion 78 is slightly less than a diameter of the receiving hole 59 of the second side panel 48 of the chassis 16. The lock 64 comprises a round head 80, a post 82 extending coaxially from the head 80, a locking backplate 84, and a spring clip 88. The head 80 and the post 82 together define a central pivot axis (not labeled) of the lock 64. A diameter of the head 80 is slightly less than a diameter of the bore 58 of the second side panel 48 of the chassis 16. A circumferential groove (not labeled) is defined in the post 82 near the head 80.

In assembly of the fixing member 60, the post 82 is inserted into the through hole 76 of the main portion 68, such that the head 80 abuts one face of the main portion 68 and the post 82 protrudes beyond an opposite face of the main portion 68. The spring clip 88 is then deformably inserted into the-groove (not labeled) of the post 82, thereby sandwiching the main portion 68 between the clip 88 and the head 80. The backplate 84 is then attached on a distal end of the post 82, such that the backplate 84 is pivotable about the pivot axis (not labeled). The lock 64 is thus firmly secured to the base 62.

Figure 3:
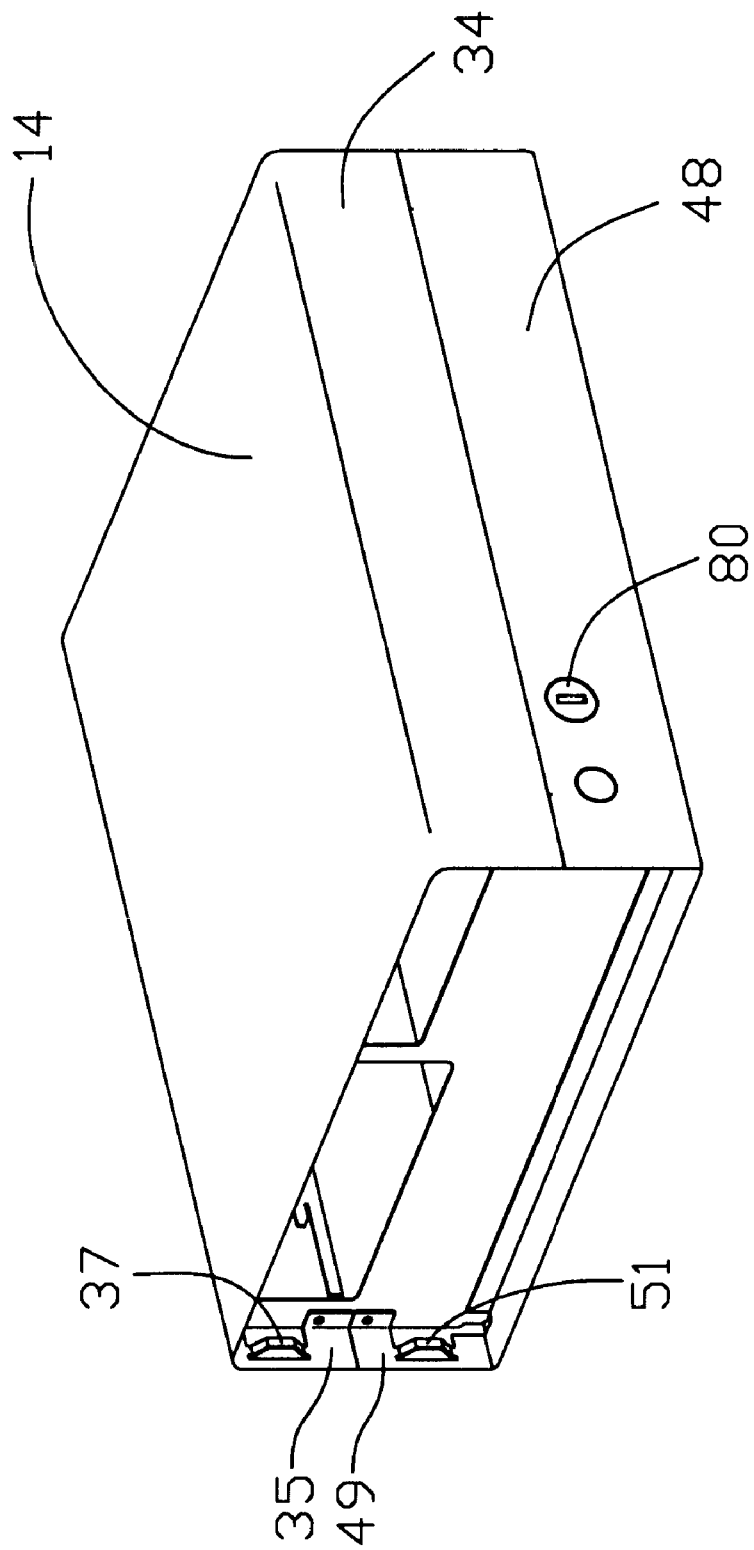
FIG. 3 is an assembled view of a computer enclosure of the bezel fastening structure of FIG. 1, but viewed from another aspect.

Referring particularly to FIG. 3, in assembly of the enclosure 10 and the fixing member 60, the fixing member 60 is firstly attached to a front portion of the side plate 22 of the main body 12 by conventional means. The combined main body 12 and fixing member 60 is then received into the chassis 16 such that the protrusion 51 and the opening 54 of the chassis 16 are located outside the main body 12. The opening 54 is aligned with the bottommost notch 26 of the main body 12. The head 80 of the lock 64 of the fixing member 60 is fittingly received in the bore 58 of the chassis 16. Simultaneously, the button position 78 of the base 62 of the fixing member 60 is movably received in the receiving hole 59 of the chassis 16. The head 80 of the lock 64 and the button portion 78 of the base 62 are both visible and operable from outside of the enclosure 10. The main body 12 is then covered with the cover 14 such that the protrusion 37 and the opening 40 of the cover 14 are located outside the main body 12. The opening 40 is aligned with the topmost notch 26 of the main body 12. The cover 14 and the chassis 16 are then secured to the main body 12 by conventional means.

Figure 4:
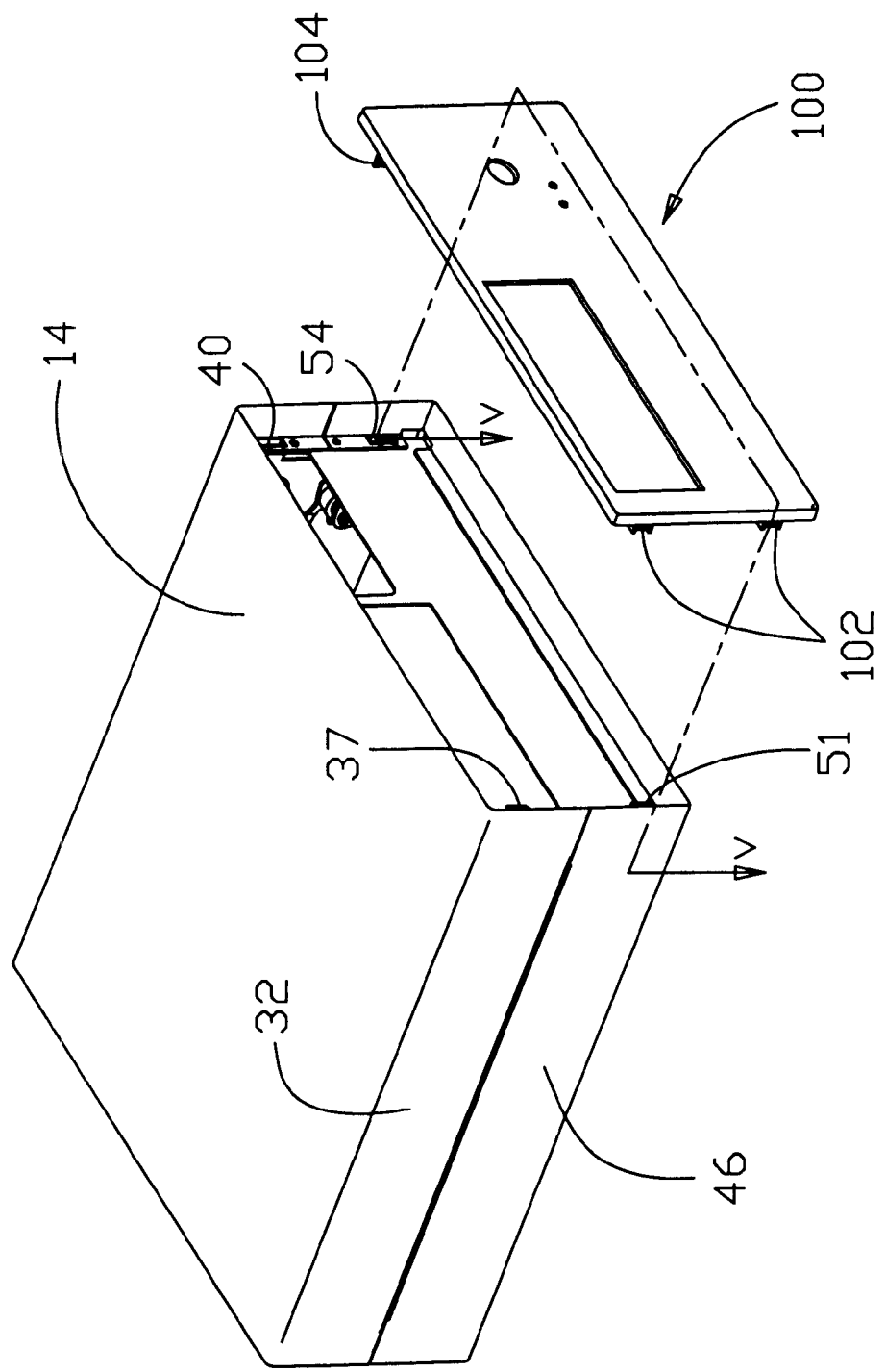
FIG. 4 is a partly assembled view of FIG. 1.

Referring particularly to FIG. 4, the bezel 100 is a substantially rectangular plate for covering a front of the enclosure 10. A pair of vertically spaced hooks 102 is rearwardly formed at one side of the bezel 100, corresponding to the protrusions 37, 51 of the cover 14 and the chassis 16 respectively. A pair of vertically spaced elastically deformable arms 104 is rearwardly formed at an opposite side of the bezel 100. Each arm 104 inwardly forms a clasp 106 (see FIG. 5), with the clasps 106 corresponding to the catches 72 of the fixing member 60.

Referring to FIGS. 1 to 5, in attaching the bezel 100 to the enclosure 10, the fixing member 60 is pre-set to allow such attachment. A key (not shown) is inserted into the lock 64 of the fixing member 60, and then rotated so that the backplate 84 of the fixing member 60 rotates away from a horizontal position. The backplate 84 is thus free from the elastic portion 70 of the base 62 of the fixing member 60. The elastic portion 70 is thus free to be elastically deformed. The hooks 102 of the bezel 100 are then engagingly and movably inserted behind and against the protrusions 37, 51 of the cover 14 and the chassis 16 respectively. An opposite end of the bezel 100 is rotatingly moved toward the enclosure 10. The arms 104 of the bezel 100 are inserted through the openings 40, 54 and the notches 26. The clasps 106 of the arms 104 are snappingly engaged with the catches 72 of the base 62 of the. fixing member 60. The key (not shown) is then rotated so that the backplate 84 rotates to the horizontal position. The backplate 84 thus abuts against the button portion 78 of the elastic portion 70. The elastic portion 70 is thereby prevented from being elastically deformed, and the catches 72 are accordingly locked in engagement with the clasps 106. Therefore, the bezel 100 is conveniently and securely attached to the enclosure 10.

To detach the bezel 100 from the enclosure 10, the key (not shown) is rotated so that the backplate 84 rotates away from the horizontal position and free from the elastic portion 70. The button portion 78 is pressed inwardly to release the catches 72 from the clasps 106. The bezel 100 is rotated away from the enclosure 10, with the elastic arms 104 disengaging from the fixing member 60 and the enclosure 10. The bezel 100 is thereupon easily removed from the enclosure 10.

Figure 6:
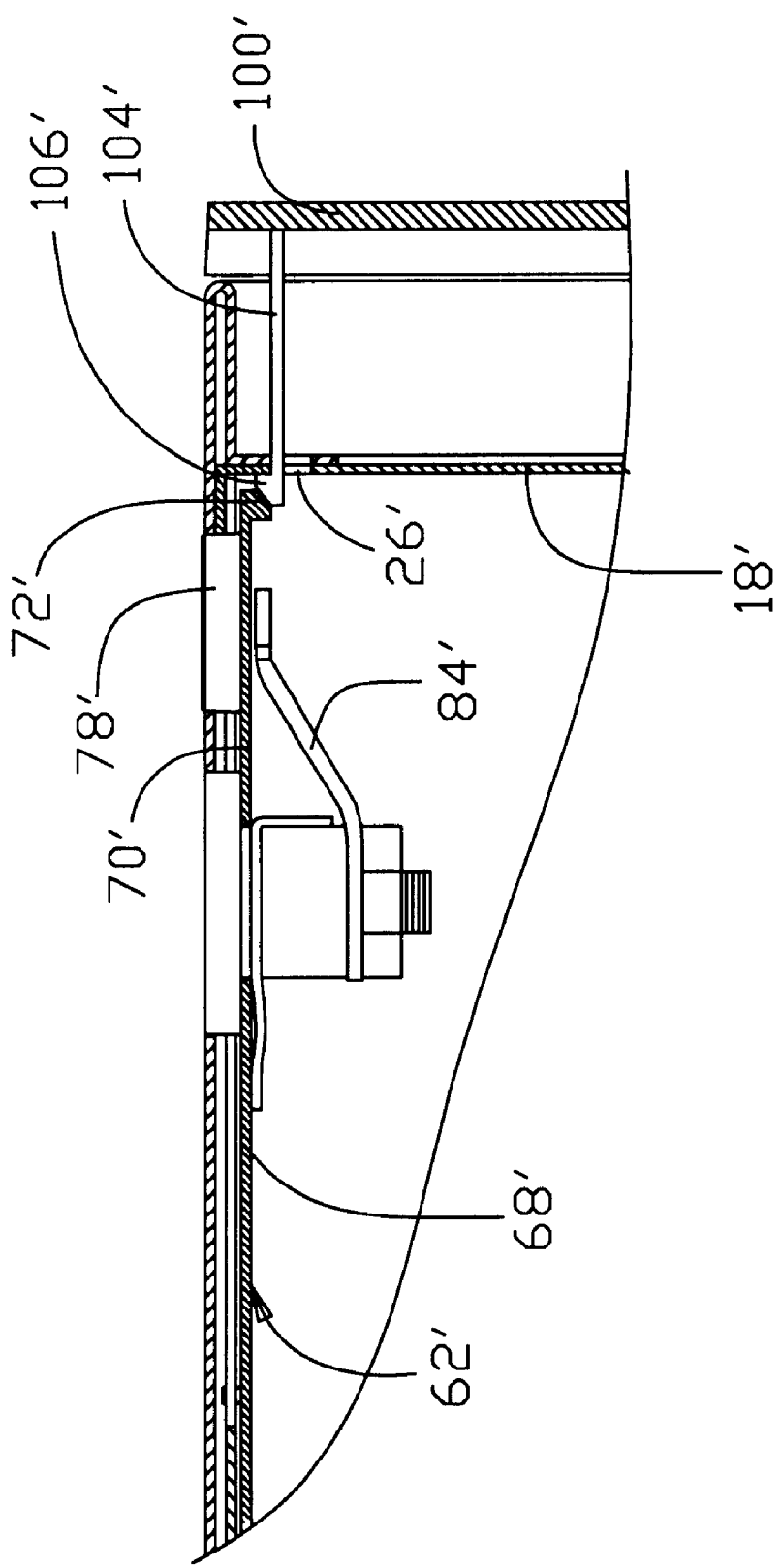
FIG. 6 is a schematic cross-sectional view of part of a bezel fastening structure in accordance with an alternative embodiment of the present invention.

FIG. 6 shows a bezel fastening structure in accordance with an alternative embodiment of the present invention. The bezel fastening structure of the alternative embodiment differs from the bezel fastening structure of the preferred embodiment as described below. The elastic portion 70' is coplanar with the main portion 68' of the base 62'. The catches 72' are formed on a face of the elastic portion 70' opposite to the face of the elastic portion 70' on which the button portion 78' is formed. The clasps 106' of the bezel 100' are outwardly formed on the elastically deformable arms 104', corresponding to the catches 72'. In assembly, the arms 104' are inserted into the notches 26'. The clasps 106' are snappingly engaged against a rear surface of the front plate 18', and simultaneously abut against the corresponding catches 72'. The locking backplate 84' is then rotated to a horizontal position to abut against the button portion 78'. The catches 72' accordingly lockingly abut against the clasps 106'. To detach the bezel 100', the backplate 84' is rotated away from the button portion 78'. The button portion 78' is pressed inwardly, causing the catches 72' to push against the clasps 106'. The arms 104' are inwardly deformed, and the clasps 106' are thereby disengaged from the front plate 18'. The arms 104' are then withdrawn from the notches 26'. The bezel 100' is thereupon easily removed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bezel fastening structure comprising:
   a computer enclosure comprising at least one first bent portion and at least one second bent portion inwardly formed at opposite sides of the enclosure respectively, the at least one first bent portion forming at least one protrusion, the at least one second bent portion defining at least one void therein, a receiving hole being defined in the enclosure proximate to the at least one void of the at least one second bent portion;
   a fixing member secured to the enclosure, the fixing member comprising a base, the base forming at least one catch and a button portion movably received in the receiving hole of the enclosure; and
   a computer bezel attached to the enclosure, at least one hook being rearwardly formed at a side of the bezel corresponding to and engaged with the at least one protrusion of the enclosure, at least one clasp being rearwardly formed at an opposite side the bezel, the at least one clasp being inserted into the at least one void of the enclosure and engaged with the at least one catch of the fixing member, wherein the engagement between the at least one clasp and the at least one catch is released by inwardly pushing the button.

2. The bezel fastening structure in accordance with claim 1, wherein the base of the fixing member comprises an elastic portion, and wherein the button portion is formed on the elastic portion.

3. The bezel fastening structure in accordance with claim 1, wherein the base of the fixing member forms a pair of catches, and wherein the button portion is located generally between the catches.

4. The bezel fastening structure in accordance with claim 1, wherein a bore is defined in the enclosure proximate to the receiving hole, and wherein the receiving hole is located between the bore and the at least one second bent portion, the fixing member comprising a lock, the lock of the fixing member comprising a head received in the bore of the enclosure.

5. The bezel fastening structure in accordance with claim 4, wherein the button portion and the lock are both visible and operable from outside of the enclosure.

6. The bezel fastening structure in accordance with claim 4, wherein the fixing member further comprises a backplate pivotally attached on the lock, for controlling movement of the button portion of the fixing member.

7. The bezel fastening structure in accordance with claim 6, wherein the lock cooperates with a spring clip to sandwich the base of the fixing member therebetween, for enhancing attachment of the lock to the base.

8. The bezel fastening structure in accordance with claim 1, wherein the at least one catch of the fixing member is outwardly formed.

9. The bezel fastening structure in accordance with claim 8, wherein the at least one clasp of the bezel is inwardly formed.

10. The bezel fastening structure in accordance with claim 9, wherein the at least one clasp of the bezel snappingly engages with the at least one catch of the fixing member.

11. The bezel fastening structure in accordance with claim 1, wherein the at least one catch of the fixing member is inwardly formed.

12. The bezel fastening structure in accordance with claim 11, wherein the at least one clasp of the bezel engages with the computer enclosure at the at least one void of the computer enclosure.

13. The bezel fastening structure in accordance with claim 12, wherein the at least one clasp of the bezel is outwardly formed.

* * * * *